United States Patent [19]
Cook et al.

[11] 3,983,301
[45] Sept. 28, 1976

[54] FILM BASE MATERIAL

[75] Inventors: Robert Stanley Cook; Keith Reid Tatchell; Kenneth Archibald Cockerton, all of Ilford, England

[73] Assignee: Ilford Limited, England

[22] Filed: May 16, 1974

[21] Appl. No.: 470,676

[30] Foreign Application Priority Data

May 16, 1973 United Kingdom .............. 23402/73

[52] U.S. Cl. ................................ 428/413; 96/87 R; 260/47 EP; 427/40; 427/407; 427/414; 428/474; 428/480

[51] Int. Cl.[2] ...................... G03C 1/80; B32B 27/36

[58] Field of Search..... 117/47 A, 138.8 F, 138.8 B, 117/76 F, 83; 96/87 R; 427/40, 407; 428/413, 480; 260/47 EP

[56] References Cited

UNITED STATES PATENTS

| | | | |
|---|---|---|---|
| 3,549,406 | 12/1970 | Ambusk | 427/40 X |
| 3,674,531 | 7/1972 | Shephard et al. | 427/40 X |
| 3,701,680 | 10/1972 | Lee et al. | 96/87 R |
| 3,702,258 | 11/1972 | Gibbons et al. | 427/40 |
| 3,738,973 | 6/1973 | Augarten et al. | 260/47 EP X |
| 3,833,405 | 9/1974 | Lee et al. | 96/87 R |

*Primary Examiner*—Ralph Husack
*Attorney, Agent, or Firm*—Wenderoth, Lind & Ponack

[57] ABSTRACT

The present invention relates to film base material. A film of synthetic linear polyester has superimposed thereon a phenoxy resin of the formula

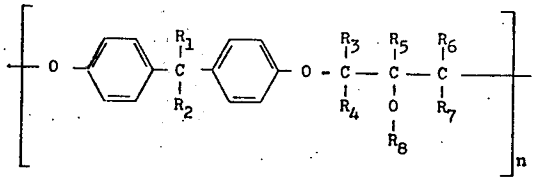

(I)

wherein each of $R_1$ to $R_7$ is a hydrogen atom or a lower alkyl or cyclohexyl group, $R_8$ is a hydrogen atom or an acyl radical of the formula $$-\underset{\underset{O}{\|}}{C}-(CH_2)_m-\overset{X}{\underset{Z}{C}}-Y \quad (II)$$

wherein $m$ is 0 to 6, at least one of X, Y and Z is a chlorine or bromine atom or a cyano group, the other of X, Y and Z are each hydrogen atoms or bromine or chlorine atoms, $n$ is at least 50 and from 50 to 100 % of the $R_8$ groups are a said acyl residue. An improved adhesion between the film base material of this composition and a hydrophilic layer coated thereon is achieved.

6 Claims, No Drawings

FILM BASE MATERIAL

It is known that self-supporting films formed of synthetic linear polyesters, particularly of the polyesters formed by reaction of ethylene glycol and terephthalic acid, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film and the emulsion layer, but the materials hitherto suggested for this purpose in connection with other film bases have not always proved entirely satisfactory when applied to film base of synthetic linear polyesters of highly hydrophobic character.

Therefore according to the present invention there is provided film base material comprising a film of synthetic linear polyester of highly hydrophobic character having superimposed thereon adherent to said film a layer which comprises a phenoxy resin which has been partially esterfied or completely esterified with a carboxylic acid, the phenoxy resin having the formula

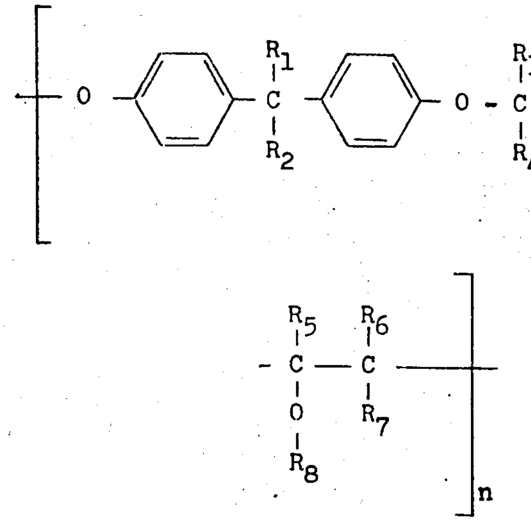

(I)

wherein each of $R_1 - R_7$ is a hydrogen atom or a lower alkyl or cyclohexyl group, $R_8$ is a hydrogen atom or represents the acyl residue of the formula

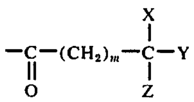

(II)

wherein $m$ is 0 to 6, at least one of X, Y and Z is a chlorine or bromine atom or a cyano group, the others of X, Y and Z are each hydrogen atoms or chlorine or bromine atoms, $n$ is at least 50 and from 50 to 100% or more narrowly, from 70 to 100% of the $R_8$ groups are a said acyl residue.

By lower alkyl group is meant an alkyl group having from 1 to 6 carbon atoms.

Preferably $R_1$ and $R_2$ in formula I are each methyl groups.

Preferably not more than two of $R_3 - R_7$ are lower alkyl group, the remainder being hydrogen atoms. Most preferably each of $R_3 - R_7$ are hydrogen atoms.

Preferably in formula II $m$ is 0, 1 or 2. Preferably also in formula II only one of X, Y and Z is a chlorine atom.

In formula I it is preferred that $n$ is 80–110 and most preferably about 100. When $n$ is greatly in excess of 100 it is difficult to coat the resins on to the film base because they are not easy to dissolve to form coating mixtures.

In order to prepare the film base material of the present invention it is necessary to treat the film of synthetic linear polyester before the resin layer is coated thereon.

Therefore according to another aspect of the present invention there is provided a process for the production of film base material which comprises treating at least one side of a film of synthetic linear polyester of highly hydrophobic character to enable a resin layer to adhere thereto and then coating on to the treated sides or sides an organic solvent solution of a phenoxy resin of formula I.

Suitable organic solvents in which to dissolve the phenoxy resin of formula I are methyl ethyl ketone, dioxan and acetone or mixtures thereof.

Preferably the treatment of the side of the film of synthetic linear polyester which enables a resin layer to adhere thereto is to coat on to the side of the polyester film an organic solvent solution of a phenolic adhesion promoting agent and then to remove the solvent, preferably by evaporation.

Synthetic organic solvents in which to dissolve the phenolic adhesion promoting agents are methanol, ethanol, methyl ethyl ketone, acetone and dioxan or mixtures thereof.

By "phenolic adhesion promoting agent" is meant a phenol-based or naphthol-based compound which is capable of acting on the polyester film base so as to render its surface more receptive to an applied layer. Examples of such compounds are m-cresol, o-cresol, resorcinol, orcinol, catechol, pyrogallol, 1-naphthol, each of which compounds may be substituted with one or more chloro-, fluoro- or nitro-substituents, and phenol substituted with one or more chloro-, fluoro- or nitro-substituents. The action of the adhesion promoting agent on the polyester film base is thought to be a swelling action and polyester surfaces so treated are receptive to certain polymeric subbing layers but not to hydrophilic layers, for example a gelatin or polyvinyl alcohol.

Alternatively the film of polyester may be treated by a physical method, for example corona discharge treatment, which renders the surface capable of accepting a resin layer as described in British patent specifications Nos. 1,262,127, 1,267,215 and 1,286,457.

The film base material of the present invention is able to accept a hydrophilic layer adherent thereto, for example a gelatin based layer, a polyvinyl alcohol layer or polyvinyl acetal layer.

The gelatin based layer may be a gelatino silver halide emulsion layer but usually when the process of the present invention is employed to prepare film base material for use in the production of photographic gelatino silver halide material an intermediate gelatin layer is provided between the phenoxy resin layer of formula I and the silver halide emulsion layer. Such an intermediate layer is used in the examples which follow.

In order to obtain improved adhesion between the film material of the present invention and a hydrophilic layer adherent thereto it is preferred that after the hydrophilic layer has been coated thereon the material is incubated or stored at an elevated temperature for one or two days.

Alternatively the hydrophilic layer when coated on to the film base material may have incorporated therein an alkaline substance, most preferably a volatile alkaline substance, for example ammonia. In this embodiment the hydrophilic layer adheres very tightly to the film base material without the need to incubate the material.

When the hydrophilic layer to be applied to the film base material as prepared by the process of the present invention is polyvinyl alcohol or polyvinyl acetal such a hydrophilic layer may comprise a light-sensitive diazonium salt to produce a diazotype material. Alternatively after polyvinyl alcohol or polyvinyl acetal layer has been coated on to the film base material as prepared by the process of the present invention the polyvinyl alcohol or polyvinyl acetal may have incorporated therein or be coated with a light-sensitive diazonium salt to produce a diazotype material.

A commercially available phenoxy resin of formula I but wherein $R_8$ is entirely hydrogen is marketed by Union Carbide as P K D A phenoxy resin.

This resin can be converted to the ester of formula I by reacting an organic solvent solution of the phenoxy resin with an acyl chloride of the formula

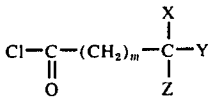

(III)

where $m$, X, Y and Z have the above meanings in the presence of pyridine at an elevated temperature.

Suitable acyl chlorides are chloroacetyl chloride, chlorobutyryl chloride, chloropropionyl chloride, cyanoacetyl chloride, cyanobutyryl chloride, trichloroacetyl chloride and bromoacetyl chloride.

PREPARATION

To a solution of 25 g of P K D A 8500 phenoxy resin, which is a compound of formula I wherein $R_1$ and $R_2$ are methyl groups and $R_3 - R_8$ are hydrogen atoms, in 200 ml or dry dioxan there was added 18 ml of pyridine. To this solution was then added slowly and with stirring 10 ml of chloroacetyl chloride. The mixture was then warmed. When the reaction was complete the solution was poured into aqueous propan-2-ol to precipitate the esterified resin. After washing and drying the esterified resin was purified by dissolving it in methyl ethyl ketone and reprecipitating it with aqueous propan-2-ol. A 99% esterified resin was obtained.

The chlorobutyryl and chloropropionyl esters of a resin of formula I were prepared in a similar manner using chlorobutyryl chloride or chloropropionyl chloride instead of chloroacetyl chloride. In each case the resin was 75% esterified.

EXAMPLE I

The following coatings were applied sequentially to biaxially oriented film based on the synthetic linear polyester obtained from ethylene glycol and terephthalic acid which is highly hydrophobic.

First coating

| | |
|---|---|
| p - Chloro-m-cresol | 2 g |
| Methanol | 100 ml |

dried 2 minutes at 70°C.

Second coating

| | |
|---|---|
| Monochloroacetate ester (approximately 99% esterified) of the phenoxy resin PKDA 8500 as previously prepared. | 2 g |
| Methyl ethyl ketone | 100 ml |

dried 5 minutes at room temperature.

Third coating

| | |
|---|---|
| Gelatin | 6.8 g |
| Phenol | 0.38 g |
| Wetting agents | 0.36 g |
| Water to | 410 ml |
| pH adjusted to 10 by the addition of ammonia (0.920) | |

air dried for 5 minutes followed by 15 minutes at 105°C.

Subsequently there was applied to the gelatin coating on the subbed film base a layer of conventional photographic gelatino silver halide emulsion. It was found that the layers were strongly adherent to one another and to the film support so that the final photographic film could be processed without danger of separation of the layers or frilling.

EXAMPLE II

The following coatings were applied sequentially to biaxially oriented film based on the synthetic linear polyester obtained from ethylene glycol and terephthalic acid which is highly hydrophobic.

First coating

| | |
|---|---|
| p - Chloro-m-cresol | 2 g |
| Methanol | 100 ml |

dried 2 minutes at 70°C.

Second coating

Monochlorobutyrate ester (75% esterified) of the phenoxy resin of PKDA 8500 as previously -continued

| | |
|---|---|
| prepared. | 2 g |
| Methyl ethyl ketone | 100 ml |

dried 5 minutes at room temperature.

Third coating

| | | |
|---|---|---|
| De-ashed gelatin | 1.68 | g |
| Water | 8.0 | ml |
| Ammonia (0.920) | 1.2 | ml |
| Methanol | 90.7 | ml |
| Ethyl lactate | 1.09 | ml. |
| Formalin, 30% by weight aqueous solution. | 0.07 | ml |

air dried for 5 minutes, then heated to 105°C for 15 minutes to remove the methanol.

Subsequentially there was applied to the gelatin coating on the subbed film base a layer of a conventional photographic gelatino silver halide emulsion. It was found that the layers were strongly adherent to one another and to the film support so that the final photographic film could be processed without danger of separation of the layers or frilling.

We claim:

1. Film base material comprising a film of synthetic linear polyester of hydrophobic character having superimposed thereon adherent to at least one entire side of said film a layer which comprises a phenoxy resin of the formula

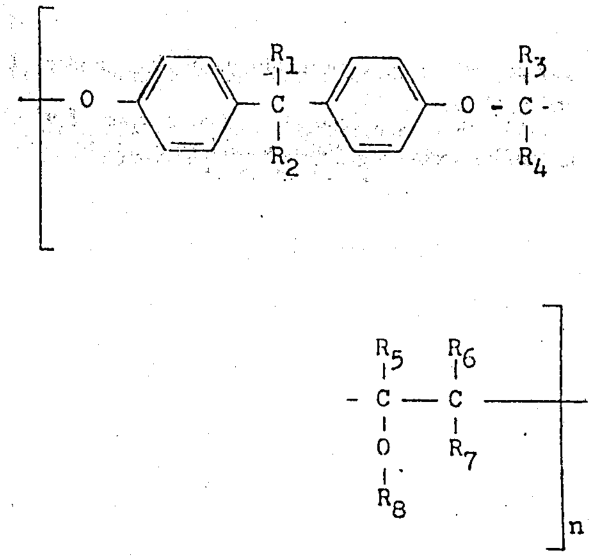

wherein each of $R_1$ through $R_7$ is hydrogen, lower alkyl or cyclohexyl, from 50 to 100% of the $R_8$ groups in the phenoxy resin represent the acyl radical of the formula

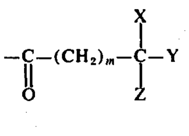

wherein $m$ is 0 or an integer from 1 to 6, at least one of X, Y and Z is chlorine, bromine or cyano, and the other of X, Y and Z are each hydrogen, bromine or chlorine, any balance of the $R_8$ groups in the phenoxy resin being hydrogen, and $n$ is at least 50.

2. Film base material as claimed in claim 1 wherein the phenoxy resin is of the formula

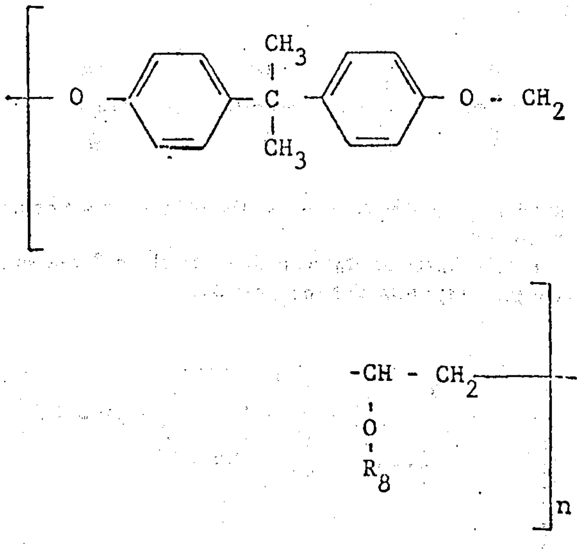

wherein from 50 to 100% of the $R_8$ groups in the phenoxy resin represent the acyl radical of the formula

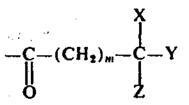

wherein $m$ represents 0 or an integer from 1 to 6, at least one of X, Y and Z is chlorine, bromine or cyano, and the other of X, Y and Z are each hydrogen, bromine or chlorine, any balance of the $R_8$ groups in the phenoxy resin being hydrogen, and $n$ is at least 50.

3. Film base material as claimed in claim 2 wherein the phenoxy resin is of the formula

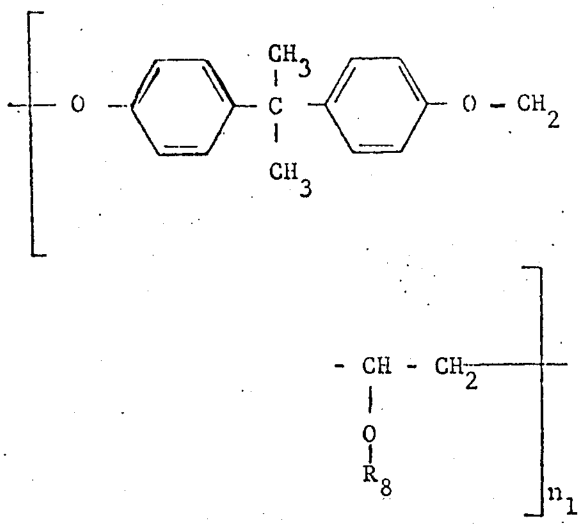

wherein $n_1$ is 80 to 110 and from 70 to 100% of the $R_8$ groups in the phenoxy resin represent the acyl radical of the formula

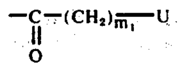

wherein $m_1$ is 0, 1 or 2 and U represents a radical selected from the group consisting of radicals of the formulae

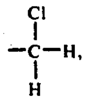 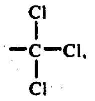 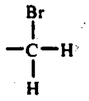 and 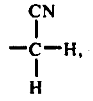

any balance of the $R_8$ groups in the phenoxy resin being hydrogen.

4. Film base material as claimed in claim 2 wherein the phenoxy resin is of the formula

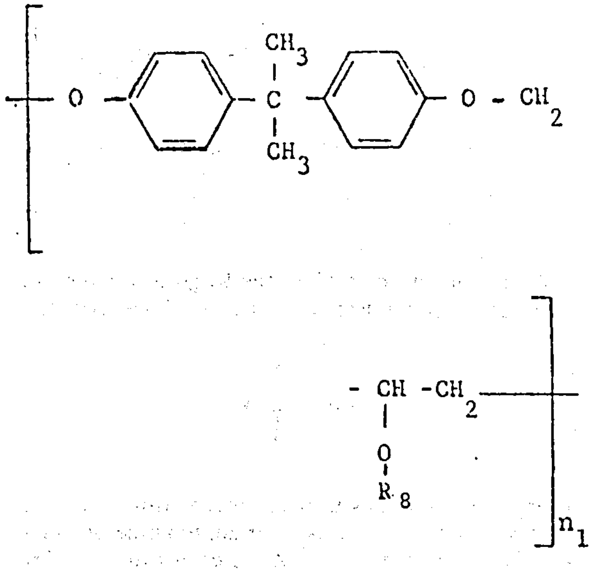

wherein $n_1$ is 80 to 110 and from 70 to 100% of the $R_8$ groups in the phenoxy resin represent the acyl radical of the formula

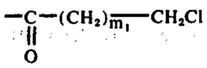

wherein $m_1$ is 0, 1 or 2, any balance of the $R_8$ groups in the phenoxy resin being hydrogen.

5. Film base material as claimed in claim 2 wherein the phenoxy resin is of the formula

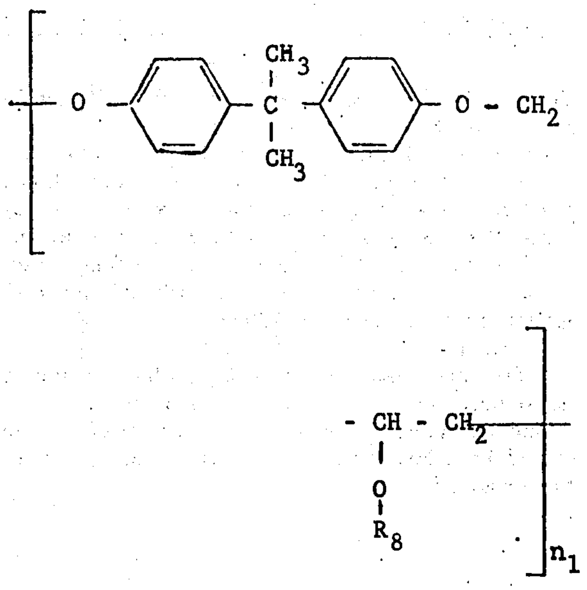

wherein $R_8$ satisfies the requirements given in claim 11 and $n_1$ is 80 to 110.

6. Film base material as claimed in claim 2 which further comprises a gelatin based layer coated thereon.

* * * * *